United States Patent [19]

Boski

[11] Patent Number: 5,080,125
[45] Date of Patent: Jan. 14, 1992

[54] HEAT RELEASABLE WELDMENT FOR MANUAL OPENING JACKS AND METHOD OF FIELD RETROFITTING

[75] Inventor: Israel Boski, Plano, Tex.

[73] Assignee: Otis Engineering Corporation, Dallas, Tex.

[21] Appl. No.: 584,632

[22] Filed: Sep. 19, 1990

[51] Int. Cl.⁵ .............................................. F16K 17/38
[52] U.S. Cl. .......................................... 137/72; 137/75
[58] Field of Search ............................. 137/72, 75, 77

[56] References Cited

U.S. PATENT DOCUMENTS

| | | | |
|---|---|---|---|
| 3,842,854 | 10/1974 | Wicke | 237/77 |
| 4,240,455 | 12/1980 | McGee | 137/77 |
| 4,421,134 | 12/1983 | Bruton et al. | 137/72 |
| 4,556,076 | 12/1985 | Bridges | 137/72 |
| 4,888,925 | 12/1989 | Harbebe | 137/75 X |
| 4,934,652 | 6/1990 | Golden | 251/63.6 |

OTHER PUBLICATIONS

Otis Engineering Corporation Products and Services, No. OEC 5516, p. 170.

Primary Examiner—John C. Fox
Attorney, Agent, or Firm—Thomas V. Malorzo

[57] ABSTRACT

A heat releasable weldment for a mechanical opening jack used in combination with fluid powered valve actuators to release said manual opening jack in the event of fire comprising grooved inner and outer members which cooperate to form a eutectic chamber, said inner and said outer members being retained in spaced relationship with each other by horizontal and vertical restraining members in cooperation with a fusable eutectic alloy which is poured into said eutectic chamber and allowed to solidify together and a method to field retrofit said weldment to a mechanical opening jack is presented.

7 Claims, 6 Drawing Sheets

HEAT RELEASABLE WELDMENT FOR MANUAL OPENING JACKS AND METHOD OF FIELD RETROFITTING

FIELD OF THE INVENTION

This invention relates to temperature sensitive release mechanisms for use on power actuated valves.

BACKGROUND OF THE INVENTION

Valves which have a remote actuator incorporated into its design and a manual override device, commonly referred to as a manual opening jack, to allow manual operation of the valve in the event of a power failure are well known in the art. Likewise, it is well known in the art to incorporate devices which are designed to override a manual opening jack to allow a valve so equipped to move to its normal position in the event of fire. Examples of such devices are disclosed in U.S. Pat. Nos. 4,421,134, 4,240,455, and 4,505,291. The major drawback of these designs is that the heat responsive mechanism must be incorporated into the manual opening jack at the time of manufacture. Thus, if it becomes desirable to place a valve incorporating such features into service after the valve has been installed in a conduit or pipe, it becomes necessary to remove the pipe section involved from service and change out the entire valve assembly.

It is also well known in the art to equip a remote valve actuator with a fire or heat sensitive lockout cap which, when fitted to the actuator, locks the valve in an actuated position, and, in response to a high heat situation such as a fire, releases the actuation mechanism to allow the valve to move into its normal position. Examples of such lockout caps are disclosed in U.S. Pat. Nos. 3,771,540, 3,838,705, 3,842,853, 3,896,835, 4,214,600, 4,245,662, and 4,271,857.

Of course, the disadvantage of such lockout caps is that valves so equipped are not operational while the cap is in place so that the function of such valves is limited to fire safety.

SUMMARY OF THE INVENTION

More specifically, this invention relates to a weldment which may be retrofitted in the field onto a manual opening jack designed for use in combination with a power actuated valve. The weldment forms a temperature sensitive release mechanism for said manual opening jack by incorporating into its design a eutectic material which melts at a specific, predetermined temperature. Thus in the presence of fire or other undesirable high temperature situations, the eutectic material melts, or fuses, thus releasing the manual opening jack thereby allowing the valve onto which such a manual opening jack has been incorporated to move into its normal position in response to an applied force as, for example, by a return spring incorporated into the valve actuation mechanism.

OBJECTS OF THE INVENTION

It is therefore an object of this invention to provide a heat sensitive release mechanism which can be retrofitted to a manual opening jack while the manual opening jack is mounted on a valve which is in service.

It is a further object of the invention to provide a fire sensitive valve having a fluid powered valve actuator with a manual override and a heat sensitive release mechanism.

The novel features of the invention are set forth with particularity in the claims. The invention well be best understood from the following description when read in conjunction with the accompanying drawings.

DETAILED DESCRIPTION OF THE INVENTION

In the description that follows, like parts are marked throughout the specification and drawings with the same reference numerals, respectively. The drawings are not necessarily to scale and the proportions of certain parts have been exaggerated to better illustrate the details of the present invention.

Referring now to FIGS. 1 through 4, the temperature sensitive release mechanism 10 is a weldment comprised of a cylindrical inner member 20 which is preventated from spatial and rotational movement and maintained in a spaced relationship to cylindrical outer member 30 within central smooth bore 301 of said cylindrical outer member 30 by horizontal spiral pins 101, 101a and vertical spiral pins 110, 110a in cooperation with a fusable eutectic alloy as hereinafter described.

Figure 3:
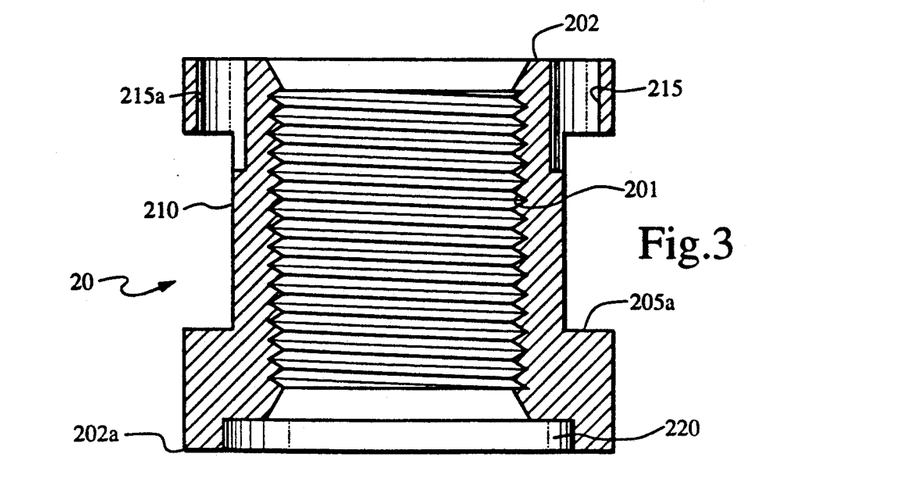
FIG. 3 is a cross section view of the inner member of the temperature sensitive release mechanism.

Inner member 20 is a cylindrically shaped member having threaded bore 201 extending therethrough between the two flat faces 202, 202a thereof. The curved external surface of said internal member has two inwardly radially stepped shoulders 205, 205a which cooperate to form external flat groove 210 about the circumference thereof. Two diametrically opposed vertical bore holes 215, 215a drilled parallel said threaded bore communicate between the external surface of the first flat face 202 and said flat groove 210. The second flat face 202a has a recess 220 concentric to said threaded bore of diameter intermediate the diameter of said threaded bore 201 and the diameter of said cylindrically shaped member, the function of which is described below.

Figure 2:
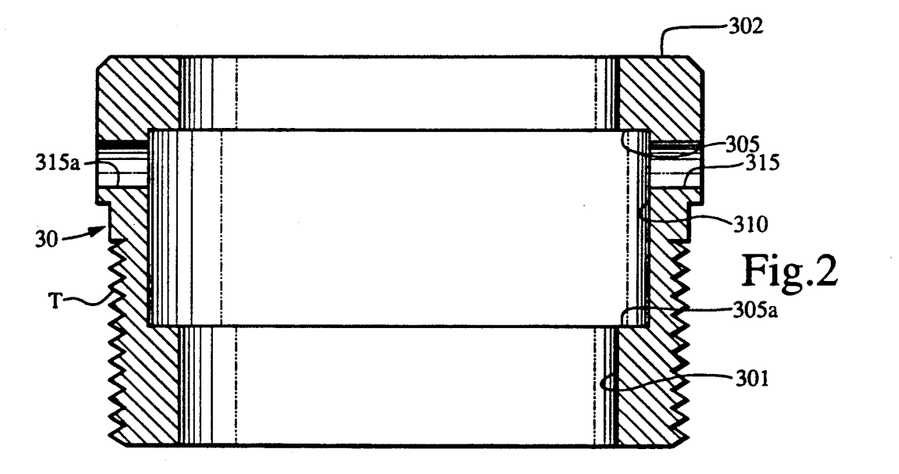
FIG. 2 is a cross section view of the outer member of the temperature sensitive release mechanism.

Outer member 30 is also a cylindrically shaped member having a smooth bore 301 of a diameter slightly larger than the maximum diameter of inner member 20 extending therethrough between the two flat faces 302, 302a. Intermediate said flat faces 302, 302a, two radially outwardly stepped shoulders 305, 305a cooperate to from an internal flat groove 310 in the wall of said smooth bore. The outside surface of said outer member has pin threads T which extend from one of said flat faces 302a along a portion of its length and two diametrically opposed horizontal bore holes 315, 315a located intermediate said threads and the other of said flat faces drilled parallel to said flat faces which communicate between the outside surface of said outer member and said outer flat groove 310.

Figures 4, 5, 6:
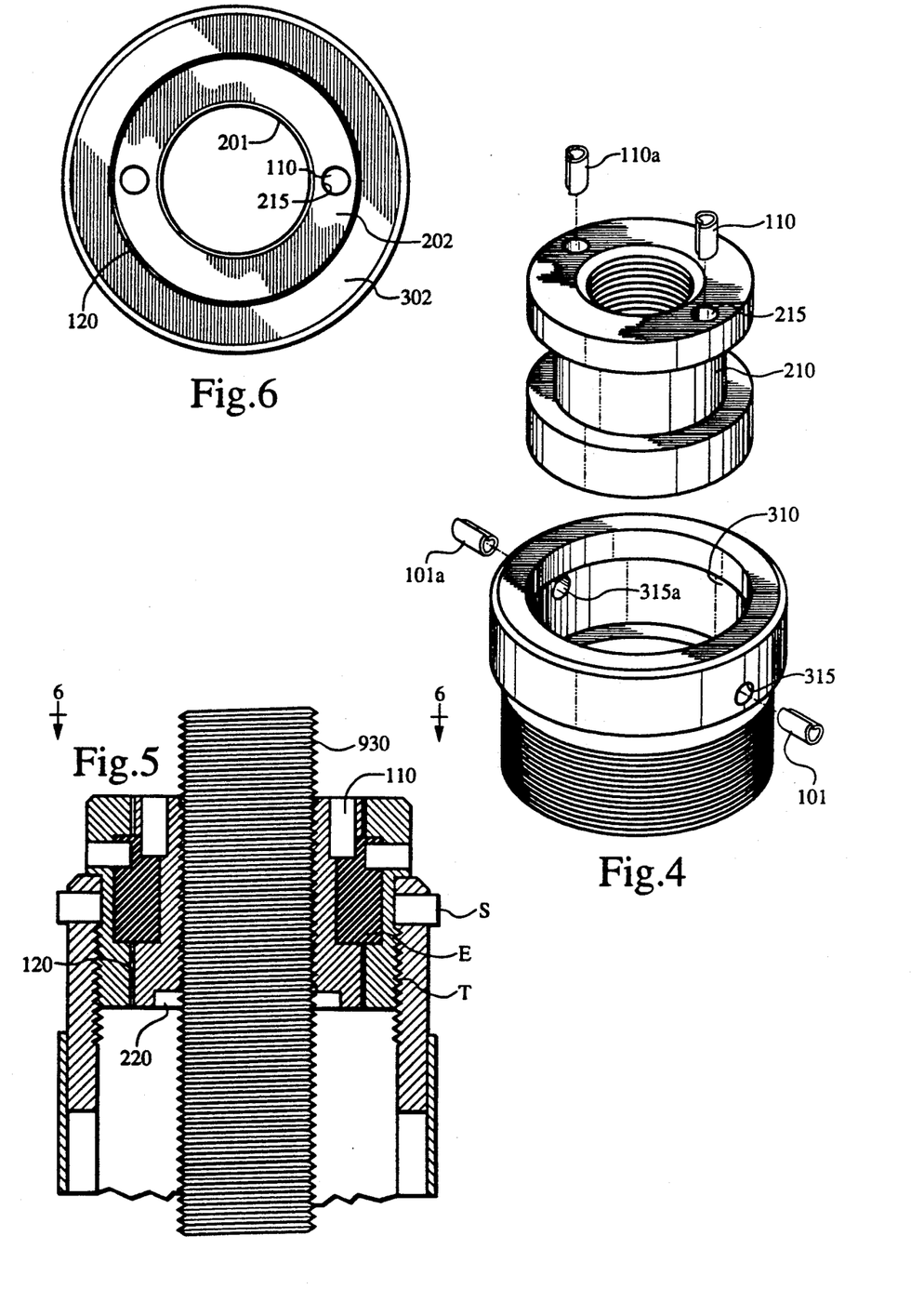
FIG. 4 is an exploded plan view of the temperature sensitive release mechanism.
FIG. 5 is a cross sectional view of the temperature sensitive release mechanism installed on a manual opening jack.
FIG. 6 is a vertical cross section of the temperature sensitive release mechanism installed on a manual opening jack taken along line 6—6.

Restricting means in the form of spiral pins 101, 101a, 110 and 110a are comprised of a thin, flat rectangular pieces of metal which are rolled into a cylinder in such fashion that the narrow ends of said rectangular piece of metal overlap. When the resulting spiral is compressed as by squeezing between the fingers, the amount of overlap is increased thus decreasing the diameter of the cylinder. Likewise, when the compressive force is released, the cylinder springs back to its original diameter.

Figure 1:
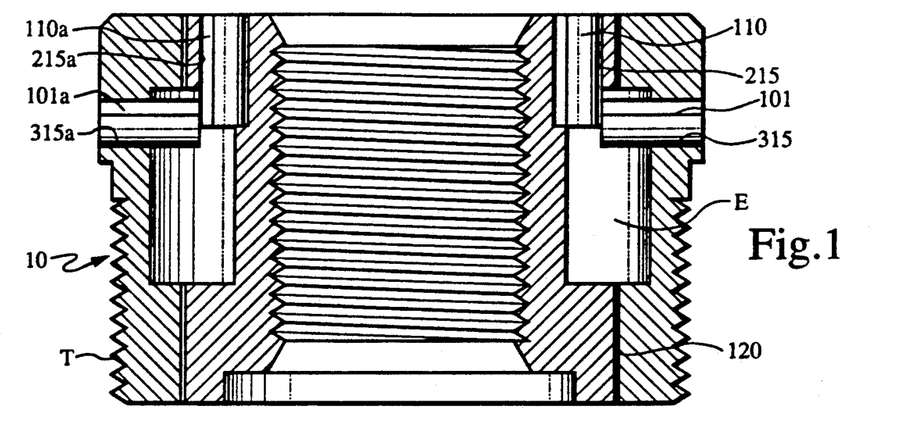
FIG. 1 is a cross section view of the temperature sensitive release mechanism.

The temperature sensitive release mechanism is assembled by placing the inner member 20 into smooth bore 301 of outer member 30 so that said flat faces 202, 202a of said inner member 20 are essentially parallel to said flat faces 302, 302a of said outer member. Spiral pins 101, 101a are fixedly inserted into horizontal bore holes 315, 315a, respectively and spiral pins 110, 110a are fixedly inserted into vertical bore holes 215, 215a, respectively, said spiral pins cooperating with solidified fusable eutectic alloy to restrict said inner member from spatial and rotational motion with reference to said outer member as hereinafter described. Once assembled, internal flat groove 210 cooperates with external flat groove 310 to form eutectic chamber E which is filled with melted fusable eutectic alloy through vertical bore holes 215, 215a and allowed to solidify. However, prior to filling eutectic chamber E with said fusable eutectic alloy, inner member 20 is arranged in spaced relationship to outer member 30 so as to form interstitial space 120 between the outer circumference of inner member 20 and the circumference of smooth bore 301. Said interstitial space is maintained in the assembled device by the solidified fusable eutectic alloy and functions as a drain hole to allow the melted fusable eutectic alloy to flow out of said eutectic chamber in the event of fire or other undesirable high temperature situation.

The fusable eutectic alloy must be chosen carefully to ensure it will melt, or fuse, quickly in the event it is exposed to flame or hot gasses which might be generated in a fire. At the same time, consideration must be given to the normal ambient temperatures to which the alloy can be expected to be exposed to avoid choosing an alloy with too low a melting point which will fuse after prolonged exposure to the rays of the sun. Therefore, the alloy should be chosen from those alloys with narrow melting ranges, preferably one degree Farenheit or less, and melting points between approximately 275 and 300 degrees Farenheit. Typically, and by way of example and not limitation, such alloys consist essentially of 57.42-60% Bismuth, 0-1.00% Lead, 0-42% Tin and 0-40% Cadmium. To one skilled in the art, it would also be obvious to choose an alloy with a higher melting point for use in applications where the alloy could be expected to be exposed to higher temperatures either as a result of extreme solar heating or as a result of exposure to artificial sources of heat such as a furnace or the like. Preferably, the eutectic alloy will consist essentially of 58.00% Bismuth and 42.00% Tin and have a melting point of approximately 281° F. and a melting range of less than one degree Farenheit. Such an alloy is sold under the trademark "Cerrotru" by Cerro Copper & Brass Company division of Cerro Corporation. One skilled in the art would recognize that alloys comprised of other materials which exhibit the same or similar melting characteristics may be used in place of the alloy described herein.

Figure 7A:
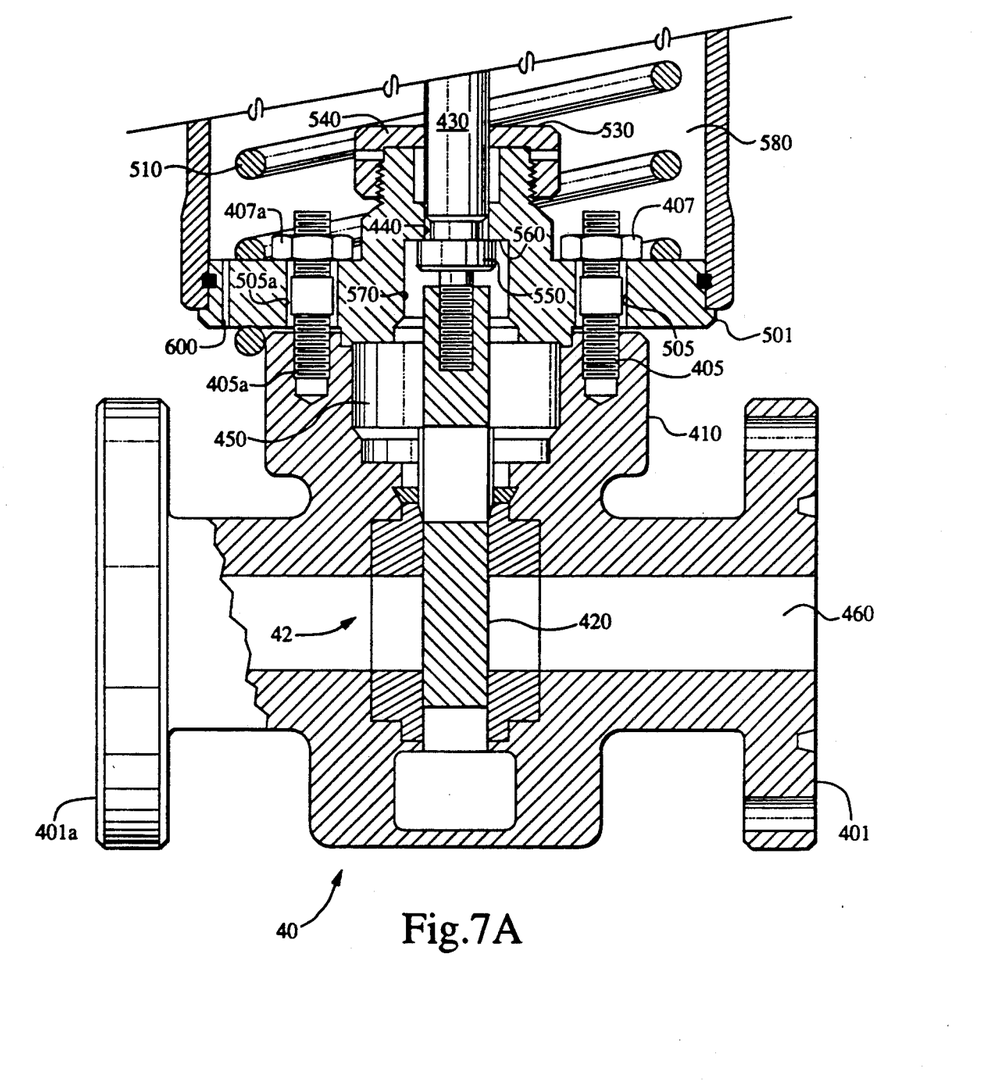
FIG. 7A is a cross section of the valve section and lower portion of an actuator in the closed position.
Figure 7B:
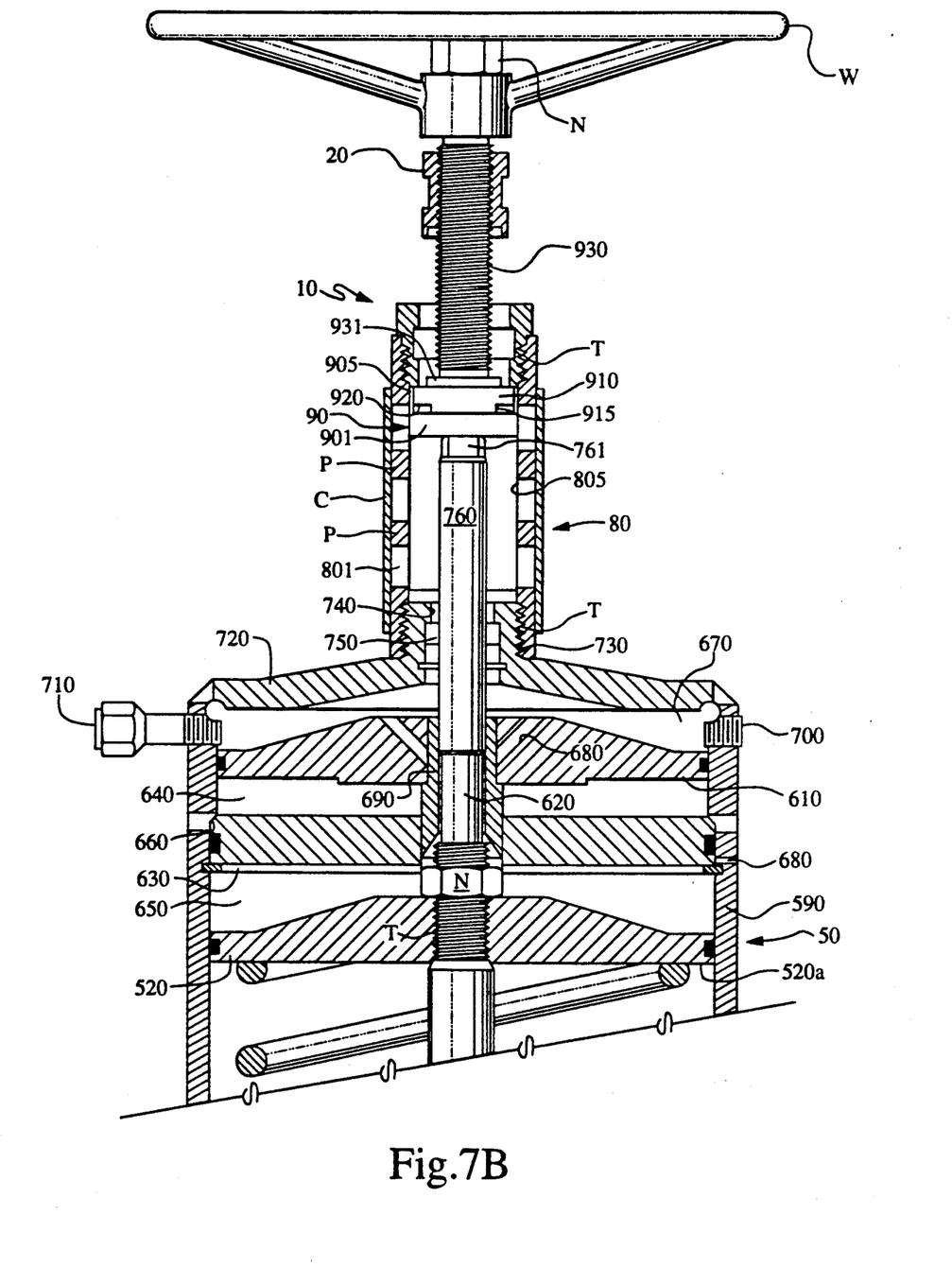
FIG. 7B is a cross section of the upper portion of a fluid powered actuator upon which a manual opening jack into which is incorporated the temperature sensitive release mechanism which has been installed in the fire release position.

Referring now to FIGS. 7A and 7B, gate valve 40 having flanges 401, 401a for attachment to similar mating surfaces in a pipe line or other devices which would employ flanges as mating surfaces, is bolted by bolts or threaded studs 405, 405a to an actuator 50, said bolts or threaded studs being secured in threaded holes drilled in valve body 410 and passing through corresponding holes 505, 505a drilled in actuator bottom plate 501 and being secured thereto by nuts 407, 407a. Valving means in the form of slab element 420 of gate assembly 42 is connected at its upper end to the lower end of valve stem 430 which extends through bonnet bore 440, located in actuator bottom plate 501, into upper gate cavity 450. The valve stem is connected to the slab element so that upon displacement of valve stem 430 along its longitudinal axis, the gate slab 420 is movable across flow passage 460 from a first position wherein the valve is closed to a second position wherein the valve is open.

Remote controlled fluid powered valve actuators such as those intended to be employed in combination with the invention disclosed herein are well known in the art and typically comprise pressure responsive means such as a piston, bellows or diaphragm enclosed within a pressure chamber and attached to a valve stem or valve stem extension and cooperates with said valve stem or valve stem extension to move valving means contained in the valve body between a first position and a second position in response to the application of fluid power to said actuator which is sufficient to overcome force generated by a second power source and further cooperating with said valve stem to return said valving means to said first position in response to pressure exerted by a second power source, such as a return spring, against said pressure responsive means when said application of fluid power ceases. An indicator stem, which is aligned within a bore hole in the pressure cap of said actuator cooperates with said pressure responsive means to reciprocally protrude from and retract into an enclosed position within said bore hole responsive to movement of said valving means between said first position and said second position.

As further shown in FIGS. 7A and 7B, remote controlled fluid powered valve actuator 50 has return spring 510 restrained between actuator bottom plate 501 and the lower face 520a of primary piston 520 and enclosed within unpressurized primary exhaust chamber 580 within pressure cylinder 590 to reciprocate said valving means upon application and release of fluid power to said actuator. The primary exhaust chamber is relieved of atmospheric pressure by a vent bore 600 formed through actuator bottom plate 501. Downward opening movement of the valve stem 430 is opposed by return spring 510 and is limited by engagement of primary piston 520 with annular face 530 of packing collar 540. By this arrangement, travel of gate slab 420 is arrested as the slab is driven to the valve open position. Retraction movement of valve stem 430 is arrested by engagement of valve stem collar 550 with annular shoulder stop 560. Bonnet bore 440 is enlarged by counter bore 570 through which valve stem shoulder 550 is extended and retracted.

Primary piston 520 is threadedly coupled to valve stem 430 at threaded portion T and secured in position by nut N.

Auxiliary piston 610 is slidably coupled in sealing engagement against the polished cylindrical surface of indicator stem 620. Downward movement of auxiliary piston 610 is limited during the opening stroke by divider plate 630 which is interposed between auxiliary exhaust chamber 640 and primary pressure chamber 650. Auxiliary exhaust chamber 640 is vented to the atmosphere through bore hole 660 in the sidewall of pressure cylinder 590 which is located immediately above divider plate 630 and below radially inset shoulder 660.

Top cap 720 pressure cylinder 590 has an axially projecting shoulder 730 which is threaded along its exterior and an internal bore 740 and contains suitable packing materials 750 through which indicator stem extension 760 reciprocally extends and retracts above the top of said shoulder in cooperation with the sliding motion of said pistons.

In operation, therefore, fluid power, either hydraulic or pneumatic is applied through control line connection 700 to first to auxiliary pressure chamber 670 and thereafter through flow path 680 and shuttle sleeve 690 to primary pressure chamber 650. Primary piston 520 and auxiliary piston 610 both exert pressure upon valve stem 430 and thence on gate slab 420. The stroke of auxiliary piston 610 is calculated so that auxiliary piston 610 bottoms out on divider plate 630 after the high gate leasing forces and frictional drag forces have been overcome. Once auxiliary piston has bottomed out as aforesaid, valve stem 430 slides out of engagement with said auxiliary piston as fluid power continues to be applied through flow path 680 to primary piston 520 which, in turn, continues to force valve stem 430 down and gate slab 420 to the full open position.

When it is desired to use the actuator to close the valve, fluid power applied to inlet port 700 is relieved and vent 710 is opened. As pressure contained in auxiliary pressure chamber 670 is relieved, the pressure in primary pressure chamber 650 eventually exceeds the pressure in said auxiliary pressure chamber and exerts an upward force on shuttle sleeve 690. This upward force propels auxiliary piston 610 to its uppermost position. Fluid pressure is vented through flow paths 680 into auxiliary pressure chamber 670 and then to the atmosphere through vent 710. Return spring 510 urges both the primary piston 520 which is attached to the upper end of valve stem 430, valve stem 430 and gate slab 420 which is attached to the lower end of valve stem 430 to the upmost, or valve closed position. Indicator stem 620 and indicator stem extension 760 are likewise urged to their upmost position.

Referring now to FIG. 7B, manual opening jack 80 is threadedly connected to said axially projecting shoulder 730 at threaded union T. Manual opening jack housing 801 is a cylindrical container which has internal, or box, threads cut in the ends of said container. Inspection ports P are cut into the wall of the cylinder and covered by port covers C. Restrained within said housing is thrust washer assembly 90.

Thrust washer assembly 90 consists of an outer cylindrical bearing member 901 which has an axially upwardly projecting shoulder 905 around its circumference and an inner cylindrical bearing member 910 having a radially inwardly stepped shoulder 915 around its lower circumference forming annular thrust washer retaining groove 920 which cooperates with outer bearing member 901 to retain a thrust washer, not shown.

Thrust washer assembly 90 is inserted into smooth longitudinal bore 805 of housing 801. Said axially upwardly projecting shoulder 905 cooperates with the inner wall of bore 805 to slidingly retain thrust washer assembly 90 in a perpendicular relationship with respect to the longitudinal axis of said bore and in contact with the upper exposed end 761 of indicator stem extension 760.

Prior to threadedly attaching fusible link weldment 10 to opening jack housing 801, threaded opening jack stem 930 described below is threadedly inserted into threaded bore 201 of internal member 20. Thereafter fusible link weldment 10 is threadedly attached to opening jack housing at its upper end forming threaded union T. As shown in FIG. 5, said fusable link element can be optionally secured against rotation in said opening jack housing by the use of set screws S.

Threaded opening jack stem 930 has an enlarged circular presser foot 931 formed on its lower end, said presser foot being of slightly smaller diameter than recess 220 of inner member 20 so that when opening jack stem 930 is in its fully withdrawn position, said presser foot 931 fits into said recess 220 to prevent inadvertant total removal of opening jack stem 930 from opening jack assembly 90. Near the upper end of opening jack stem 930 is an unthreaded portion upon which flats have been formed to engage corresponding slots in hand wheel W and an additional threaded portion at the uppermost end upon which is threaded retaining nut N.

Weldment 10 can be retrofitted to a manual opening jack by first removing retaining nut N and hand wheel W. An opening jack cap, which normally occupies the position occupied by weldment 10 is then threadedly removed, after which threaded opening jack stem 930 is removed from said opening jack cap. Opening jack stem 930 is then threaded into threaded opening 220 of inner member 201 of the assembled fusible weldment 10 and the resulting assembly is then threadedly attached to opening jack housing 801. Hand wheel W is then fitted to the flats in the upper end of said threaded opening jack stem and held in place by retaining nut N.

Figure 8:
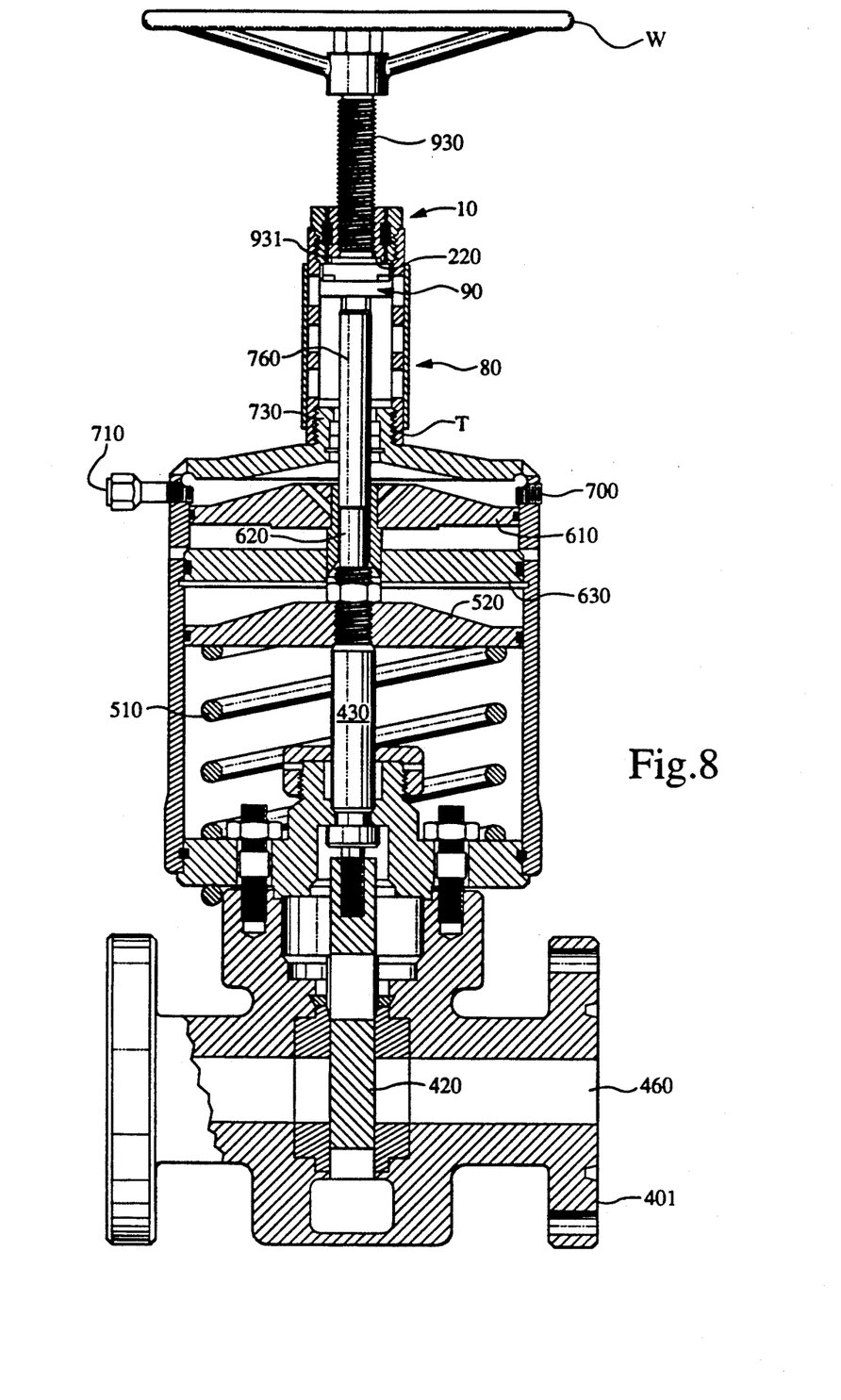
FIG. 8 is a cross section of a manual opening jack into which is incorporated the temperature sensitive release mechanism which has been installed upon a fluid power operated actuator in conjunction with a gate valve in the power mode closed position.

As shown in FIG. 8, in normal, powered, operation, threaded opening jack stem 930 is maintained in its most outward position so that presser foot 931 is in contacting engagement with recess 220 of inner member 20. In this position, actuator stem extension 760, in cooperation with actuator stem 430 is free to reciprocate within the actuator housing opening and closing valve 50 in response to the application of fluid power through ported connection 700 and the venting of said fluid power through vent 710. When the opening jack stem 930 is fully withdrawn, thrust washer assembly 90 which is in contacting engagement with upper end 761 of valve stem extension 760 slides reciprocally within said longitudinal bore 805 of housing 801 in response to pressure applied by indicator stem extension 760.

Figure 9:
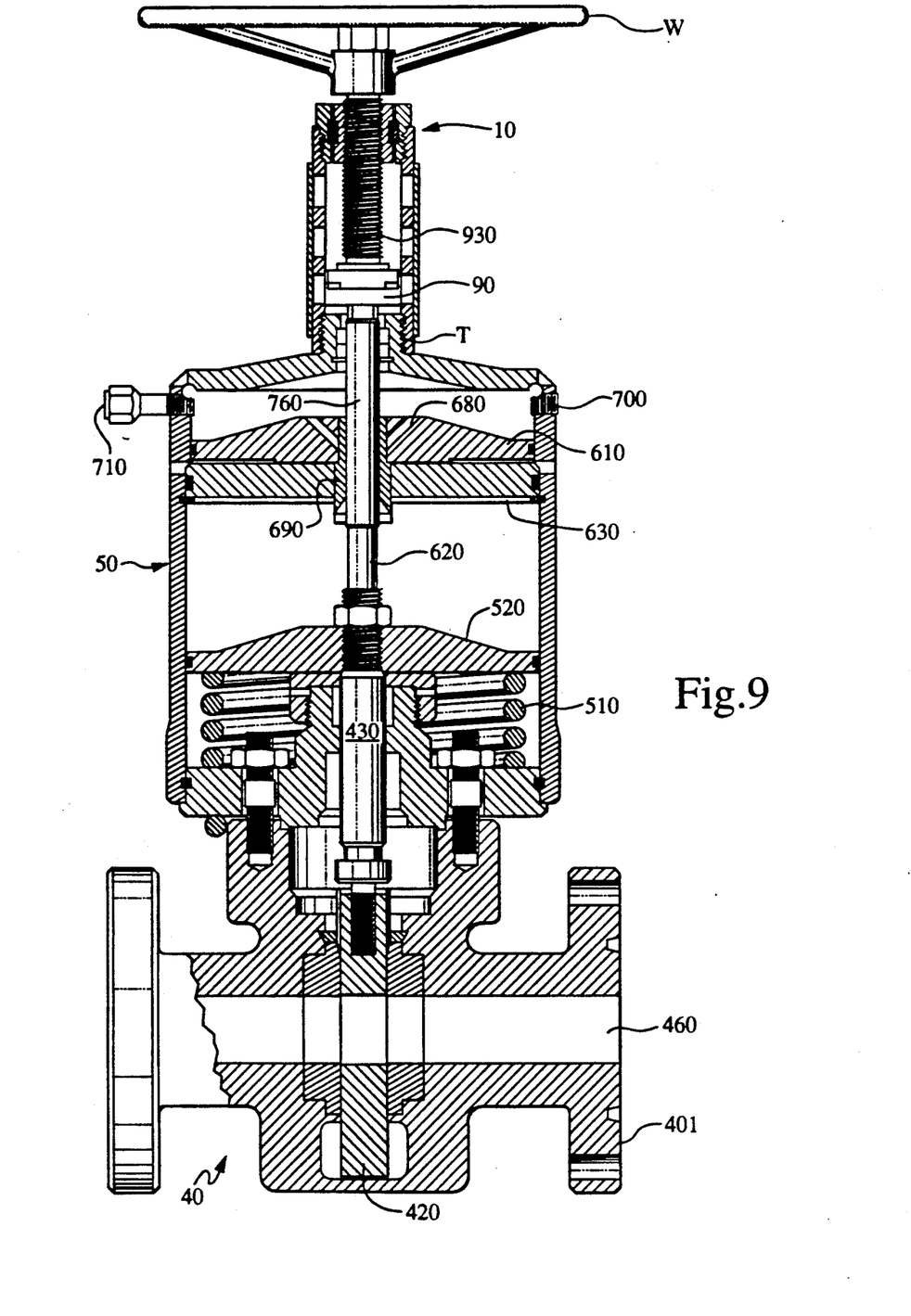
FIG. 9 is a cross section of a manual opening jack into which is incorporated the temperature sensitive release mechanism which has been installed upon a fluid power operated actuator in conjunction with a gate valve in the manual open position.

As shown in FIG. 9, in the event of the failure of fluid power the valve actuator is urged from a first position to a second position by return spring 510. It is possible to move the valve from said second position to said first position, as from open to closed by turning hand wheel W thereby advancing threaded opening jack stem 930 into the bore of opening jack housing 801 and into contacting engagement with inner member 905 of thrust washer assembly 90. As pressure upon thrust bearing assembly 90, indicator stem extension 760 and valve stem 430 is increased as a result of the force exerted by opening jack stem 930 against the resistance of return spring 510, frictional resistance to circular movement of opening jack stem 930 by stem extension 760 is dissipated in the thrust washer assembly thereby allowing movement of the gate assembly from the normally closed position of the gate slab to the open position.

As shown in FIG. 7B, in the event of fire, the fusable eutectic alloy contained in eutectic chamber E quickly fuses and drains from weldment 10 through interstitial space 120 thereby permitting inner member 20 to move freely within assembly 10 in response to pressure exerted by return spring 510. As pressure exerted by return spring 510 is transmitted to threaded opening jack stem 930 through indicator stem 620 in cooperation with indicator stem extension 760 and thrust washer assembly 90, inner member 20 is forced out of engagement with outer member 30. Inner member 20 which is in threaded engagement with opening jack stem 930 is urged out of opening jack housing 801. Also in response to said pressure exerted by said return spring 510, valve stem 430 and gate slab assembly 42 are pulled into the normally closed position with flow passage 460 being occluded by slab element 420.

Although the invention has been depicted in combination with a dual piston valve actuator operated by the application of fluid power, it will be readily understood by on skilled in the art that a manual opening jack incorporating the invention is also intended to be of utility in conjunction with any valve actuator mechanism which incorporates a valve stem or an indicator stem which extends from the actuator body and a return spring to supply motive force to move the valving member of said valve from an actuated position to a normal position.

This invention has been described with reference to an exemplary embodiment, however, the foregoing description is not intended to be construed in a limiting sense. Various modifications of the disclosed embodiment as well as alternative applications of the invention will be suggested to persons skilled in the art by the foregoing specification and illustrations. It is therefore contemplated that the appended claims will cover any such modifications, applications or embodiments as fall within the true scope of the invention.

What is claimed is:

1. A heat releasable weldment for a manual opening jack comprising:
    a. a cylindrical outer member having a smooth bore therethrough, said smooth bore having an internal flat groove about the interior circumference thereof;
    b. a cylindrical inner member having a threaded bore therethrough said inner member being inserted within said smooth bore, said threaded bore being radially spaced from an external flat groove around the exterior circumference thereof;
    c. said internal flat groove and said external flat groove cooperating to form an eutectic chamber;
    d. said inner member and said outer member each having restraining means bores therethrough which communicate between the outside of said member and said eutectic chamber;
    e. restricting means fixedly inserted within said restricting means bores, and
    f. said eutectic chamber being filled with a fusable eutectic mixture, said fusable eutectic mixture cooperating with said restricting means to retain a spaced relationship between said inner member and said outer member and to prevent spatial and rotational movement of said inner member within said smooth bore of said outer member.

2. The heat releasable weldment of claim 1 wherein said restricting means is a spiral pin.

3. The heat releasable weldment of claim 1 wherein said fusable eutectic mixture consists essentially of 57.42–60.0% Bismuth, 0–1% Lead, 0–42% Tin, and 0–40% Cadmium.

4. The heat releasable weldment of claim 1 wherein said fusable eutectic mixture has a melting range of less than 1° F.

5. The heat releasable weldment of claim 1 wherein said fusable eutectic material has a yield point between 275° F. to 291° F.

6. The heat releasable weldment of claim 3 wherein said fusable eutectic material consists of 58.00% Bismuth and 42.00% Tin.

7. The heat releasable weldment of claim 3 wherein said fusable eutectic material preferably has a yield point of about 281° F.

* * * * *